United States Patent [19]
Hobson et al.

[11] 3,727,083
[45] Apr. 10, 1973

[54] ALL BONDED THERMIONIC ENERGY CONVERTER

[75] Inventors: Robert R. Hobson, San Jose, Calif.; John B. Dunlay, Wayland, Mass.

[73] Assignee: The United States of America as represented by the United States Atomic Energy Commission

[22] Filed: Sept. 1, 1970

[21] Appl. No.: 78,327

[52] U.S. Cl. .......................................... 310/4, 176/39
[51] Int. Cl. .................................................. H02n 3/00
[58] Field of Search ............................. 310/4; 176/39

[56] References Cited

UNITED STATES PATENTS

| 3,548,222 | 12/1970 | Hobson | 310/4 |
| 3,211,930 | 10/1965 | Clement et al. | 310/4 |
| 3,607,631 | 9/1971 | Hobson | 310/4 |
| 3,563,856 | 2/1971 | Gross et al. | 176/39 |

Primary Examiner—Benjamin A. Borchelt
Assistant Examiner—Harold Tudor
Attorney—Roland A. Anderson

[57] ABSTRACT

A thermionic fuel element for electrical power generation having an all bonded sheath-sheath insulator collector assembly. The thus bonded assembly is provided with at least one internal groove by which an emitter intercell sub-assembly is bonded to the first-mentioned assembly. The subassembly is constructed to provide the required electric interconnections between a series of interconnected collector-emitter units or cells as well as providing passageways for an alkali metal vapor located in an interelectrode space, while providing proper spacing between the collector and emitter units thereof. In addition each sub-assembly includes means which readily allows the subassembly to be inserted, aligned and secured to the first-mentioned assembly while supporting the emitter, maintaining the emitter to collector gap, and providing a heat transfer path to the first-mentioned assembly.

9 Claims, 3 Drawing Figures

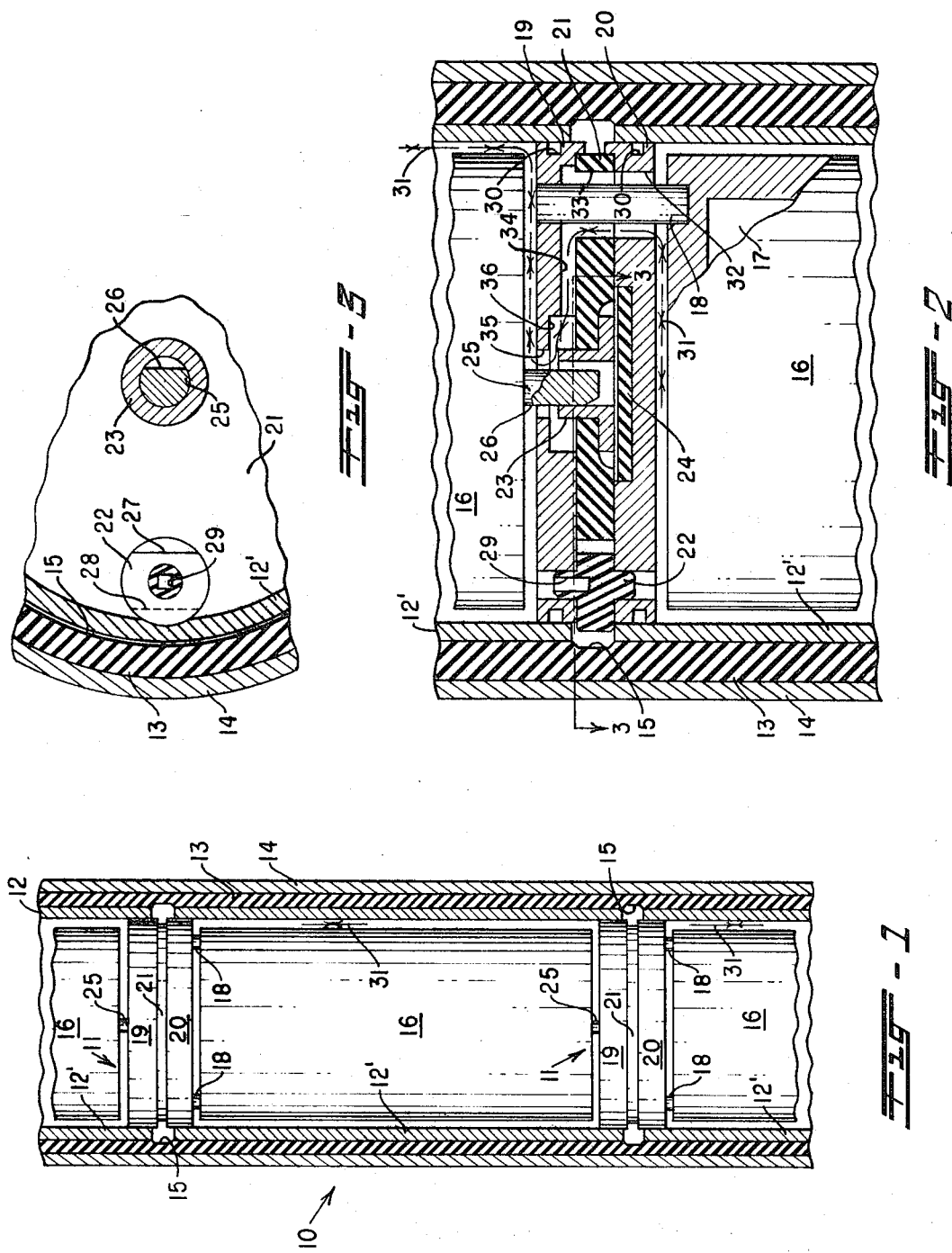

ALL BONDED THERMIONIC ENERGY CONVERTER

BACKGROUND OF THE INVENTION

The invention described herein was made in the course of, or under, Contract No. AT(04-3)-189 Project Agreement No. 32, with the United States Atomic Energy Commission.

This invention relates to thermionic energy converters, particularly to thermionic energy converters using nuclear fuel, and more particularly to an all bonded thermionic fuel element for electrical power generation.

Thermionic energy converters utilizing nuclear fuel as a heating source for the emitter-collector assembly and the general operation thereof are known in the art as exemplified by U.S. Pat. No. 3,211,930 to J. D. Clement et al. and U.S. Pat. No. 3,330,974 to V. C. Wilson. These patents are illustrative of the numerous configurations and structural arrangements utilized in the prior art as efforts in this field have been carried forward to provide more efficient electrical power generation thereby.

SUMMARY OF THE INVENTION

The present invention is an improved thermionic fuel element for the generation of electrical power by providing an all bonded element. Basically, the inventive thermionic fuel element comprises an all bonded sheath-sheath insulator-collector assembly and an emitter intercell sub-assembly, the sub-assembly being constructed for insertion into and alignment with the first first-mentioned assembly, whereafter the sub-assembly is bonded therein to provide an all bonded element, wherein the emitter-collector gap is maintained while improving the cooling efficiency.

Therefore, it is an object of this invention to provide an improved thermionic fuel element.

A further object of the invention is to provide an all bonded thermionic fuel element for generation of electrical energy.

Another object of the invention is to provide an all bonded thermionic fuel element having an improved and readily repeatable heat path from collector to outer sheath and from intercell to outer sheath.

Another object of the invention is to provide an all bonded thermionic fuel element including an all bonded sheath-sheath insulator-collector assembly within which is bonded at least one emitter intercell sub-assembly.

Other objects of the invention will become readily apparent from the following description and accompanying drawing.

BRIEF DESCRIPTION OF THE DRAWINGS

FIG. 1 is a view, partially in cross-section, of a portion of a thermionic fuel element made in accordance with the invention;

FIG. 2 is a view, partially in cross-section, illustrating the intercell sub-assembly construction of the novel fuel element; and FIG. 3 is a view taken along the line 3—3 of FIG. 2.

DESCRIPTION OF THE INVENTION

The embodiment of the invention illustrated in FIG. 1 basically comprises an all bonded outer or sheath-sheath insulator-collector assembly generally indicated at 10 and a plurality of inner or emitter intercell sub-assemblies generally indicated at 11 and bonded in spaced relationship within the sheath assembly 10. The all bonded sheath assembly 10 consists of a collector tube 12, a sheath insulator tube 13, and a sheath tube 14 bonded together by pressure bonding, brazing, or other suitable means known in the art. After bonding, circumferential grooves 15 (one for each sub-assembly 11) are machined or otherwise formed through the collector tube 12 and slightly into insulator tube 13 to divide tube 12 into individual collectors 12' which are electrically insulated from each other, but each collector 12' is bonded to the sheath insulator tube 13.

Each inner or emitter intercell sub-assembly 11 (only one shown in detail) comprises an emitter unit 16 and an intercell unit of components consisting of all the remaining parts used in the thermionic converter portion of the thermionic fuel element, these components being illustrated in greater detail in FIGS. 2 and 3. As shown in FIG. 2, emitters 16 each contain a centrally located heat source indicated at 17 which may, for example, be a fissionable material or other heating means. Emitters 16 may, for example, be constructed of tungsten or other suitable cathode materials capable of withstanding the operating temperatures of 1,600°C or higher. In addition to the emitter 16, the intercell unit containing components of each of the sub-assemblies 11 comprises three or more electrical connecting pins 18 (only one shown in FIG. 2 and two in FIG. 1) spaced, for example, about 120° apart, a support collector disc 19, a shield collector disc 20 for shielding an intercell insulator 21, three or more locating insulators 22 (only one shown), a radial spacer socket 23, and a socket insulator 24. On the end of each emitter 16, opposite the electrical connecting pins 18 is a radial spacer pin 25 provided with a flat surface 26 on one side thereof. The collector discs 19 and 20 and intercell insulator 21 are, for example, brazed together in a manner which captures the locating insulators 22, spacer socket 23, and socket insulator 24 but maintains electrical insulator properties of the insulator materials and freedom to rotate locating insulators 22. This brazed assembly (discs 20–21 and intercell components) is attached to the emitter 16 with the electrical connecting pins 18 in a manner which spaces the collector disc 20 relative to the emitter 16 and maintains concentricity between the intercell parts and emitter 16.

With locating insulators 22 rotated with flat sections 27 (see FIG. 3) in position shown by the dotted line 28, the inner or emitter intercell sub-assemblies 11 are inserted into the outer or sheath assembly 10, one at a time. Each emitter intercell sub-assembly 11 is inserted to where it is aligned with the proper circumferential groove 15. The locating insulators 22 are then rotated at least 90° by inserting an appropriate tool in a socket 29 in insulator 22 and turning the insulator into the groove 15 as shown in FIGS. 2 and 3, the flat portion or section 27 of the locating insulator 22 being now located as shown in FIG. 3. The next sub-assembly 11 is then inserted into sheath assembly 10 until its spacer pin 25 enters the spacer socket 23 of the preceding sub-assembly, and its locating insulators 22 are aligned with its associated groove 15 in the sheath assembly whereby insulators 22 are rotated as described above to retain the sub-assembly 11 in the assembly 10. The flat surface 26 on spacer pin 25 is to facilitate evacuation of the thermionic fuel element after final assembly. After insertion of all the sub-assemblies 11, as above described, braze wires (not shown) or other suitable bonding means, located in the grooves 30 of the collector discs 19 and 20, melt upon the assembly 10 being heated to brazing temperature, and upon subsequent cooling, braze the collector discs 19 and 20 to their respective collectors 12', thus permanently attaching and spacing the inner or emitter intercell sub-assemblies 11 in the outer or sheath assembly 10. The direct contact between collector discs 19 and 20 to collectors 12' provide a heat transfer path from the emitter 16 through pins 18, discs 19 and 20 to sheath assembly 10 providing a more efficient cooling.

Electrical series connections between adjacent converter units are provided from collector 12' of one unit through support collector disc 19, electrical connecting pins 18, to emitter 16 of the adjacent unit. The emitters 16 are supported and properly spaced relative to collectors 12' by the connecting pins 18 and radial spacer pin 25. Cesium passage, as indicated by the double arrows 31, between adjacent converter units, is provided for by the clearance holes 32 and 33 around the connecting pins 18 in the collector disc 20 and intercell insulator 21, respectively, radial slots 34, only one shown, in collector disc 19, and the clearance hole 35 around the spacer pin 25 in collector disc 19, clearance hole 35 including a countersunk section 36 providing clearance about spacer socket 23. Note that the construction of the passageway 31 does not provide a "line of sight" between the series mounted emitters 16 and thus prevents line of sight electrical shorting problems therebetween.

It is thus seen that the present invention produces an advancement in the art by providing on all bonded thermionic fuel element which includes an all bonded sheath-sheath insulator-collector assembly within which is bonded at least one bonded intercell sub-assembly. The inner or emitter intercell sub-assembly being constructed to provide easy insertion and positioning thereof within said outer or sheath-sheath insulator-collector assembly, and bonding same together. The novel all bonded arrangement provides more effective heat transfer while maintaining the desired emitter-collector gap.

While a particular embodiment of the invention has been illustrated and described, modifications and changes will become apparent to those skilled in the art, and it is intended to cover in the appended claims all such modifications and changes as come within the spirit and scope of the invention.

What we claim is

1. A thermionic energy converter comprising a bonded outer assembly and at least one inner sub-assembly bonded within said outer assembly for securing said sub-assembly therein and providing operative electrical connection therebetween; said bonded outer assembly comprising a plurality of layers of tube-like materials including at least one inner collector tube-like means; each of said inner sub-assemblies comprising an emitter unit and an intercell unit, said emitter unit including a heat source therefor, said intercell unit including a pair of disc-like means constructed of electrically conductive material having an outer portion located adjacent said inner collector tube-like layer of said outer assembly, an insulator means located intermediate said pair of disc-like means, at least one of said pair of disc-like means being provided with bonding material in the peripheral portion thereof to effect bonding thereof to said inner collector tube-like means upon raising said bonded outer assembly to bonding temperatures; means for electrically interconnecting one of said disc-like means to said emitter unit and in spaced relationship with respect to said pair of disc-like means, means retained by said pair of disc-like means for locating said inner sub-assembly within said outer assembly, said pair of disc-like means and said insulator means being provided with passageways therethrough, said emitter unit being secured to said intercell unit so as to define a space between said emitter unit and said outer assembly and in communication with said passageways of said intercell unit.

2. The thermionic energy converter defined in claim 1, wherein said plurality of layers of tube-like materials of said bonded outer assembly comprises; comprises: outer sheath tube-like means, at least said one inner collector tube-like means, and an insulator tube-like means intermediate said outer sheath tube-like means and said inner collector tube like means.

3. The thermionic energy converter defined in claim 2, wherein said bonded outer assembly includes a plurality of inner collector tube-like means spaced in series relationship one with another.

4. The thermionic energy converter defined in claim 3, wherein a plurality of said inner sub-assemblies are positioned within said bonded outer assembly, each of said inner sub-assemblies being fixedly secured to an adjacent pair of said spaced inner collector tube-like means.

5. The thermionic energy converter defined in claim 1, wherein said bonded outer assembly includes a plurality of said inner collector tube-like means spaced in series relationship with one another, and includes a plurality of said inner sub-assemblies positioned within said bonded outer assembly, each of said inner sub-assemblies being fixedly secured to an adjacent pair of said spaced inner collector tube-like means.

6. The thermionic energy converter defined in claim 5, wherein said plurality of layers of tube-like material of said bonded outer assembly includes in addition to said plurality of inner collector tube-like means, an insulator tube-like means adjacent said inner collector tube-like means, and an outer sheath tube-like means adjacent said insulator tube-like means.

7. The thermionic energy converter defined in claim 1, wherein said locating means retained by said pair of disc-like means comprises a plurality of rotatably mounted locating insulator means, each of said locating insulator means including a flat side portion, whereby rotation of said locating insulator means such that said flat side portions thereof are adjacent said inner collector tube-like means allows said sub-assembly to be positioned within said outer assembly, and rotation of said locating insulator means such that said flat side portions thereof are turned to at least 90° with respect to said inner collector tube-like means retains said sub-assembly in said outer assembly.

8. The thermionic energy converter defined in claim 1, wherein said means for electrically interconnecting one of said disc-like means to said emitter means comprises a plurality of pin-like means of electrically conductive material fixedly secured to said one of said disc-like means and said emitter means, said pin-like means extending through said passageways in said insulator means and in the other of said pair of disc-like means.

9. The thermionic energy converter defined in claim 1, wherein said emitter means includes an aligning pin-like means in the end opposite the end thereof adjacent said pair of disc-like means, and wherein a socket-like means is operatively positioned in and insulated from said pair of disc-like means adapted for accepting an aligning pin-like means of an adjacent emitter means.

* * * * *